US011222450B2

United States Patent
Takeno (10) Patent No.: US 11,222,450 B2
(45) Date of Patent: Jan. 11, 2022

(54) SYSTEM AND METHOD FOR MONITORING MACHINE TOOL OPERATIONS WITH SUPERIMPOSED CHRONOLOGICAL INFORMATION

(71) Applicant: FANUC CORPORATION, Yamanashi (JP)

(72) Inventor: Shouhei Takeno, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 4 days.

(21) Appl. No.: 16/223,813

(22) Filed: Dec. 18, 2018

(65) Prior Publication Data
US 2019/0236823 A1    Aug. 1, 2019

(30) Foreign Application Priority Data
Jan. 30, 2018 (JP) .............................. JP2018-014051

(51) Int. Cl.
*G06T 11/60* (2006.01)
*G06T 11/20* (2006.01)
(Continued)

(52) U.S. Cl.
CPC ............... *G06T 11/60* (2013.01); *B23C 9/00* (2013.01); *B23Q 15/22* (2013.01); *G06T 11/206* (2013.01)

(58) Field of Classification Search
None
See application file for complete search history.

(56) References Cited

U.S. PATENT DOCUMENTS 5,179,857 A * 1/1993 Sonderegger ......... F02B 77/085
73/114.07
5,800,748 A * 9/1998 Kamiguchi ............. B29C 45/77
264/40.1
(Continued)

FOREIGN PATENT DOCUMENTS

CN      205540212 U     8/2016
DE    102004001010 A1  10/2004
(Continued)

OTHER PUBLICATIONS

Notification of Reasons for Refusal dated Jan. 8, 2020 in Japanese Patent Application No. 2018-014051.
(Continued)

*Primary Examiner* — Patrick F Valdez
(74) *Attorney, Agent, or Firm* — Wenderoth, Lind & Ponack, L.L.P.

(57) ABSTRACT

A display unit which displays information obtained from a machine tool that executes a machining program including a plurality of blocks as a plurality of program blocks identified by sequence numbers, includes: a data acquisition unit which acquires state information that indicates the state of the machine tool being operated as an amount of variation and a time axis, and timing information which indicates predetermined timing of the machining program executed by the machine tool; a chronological information generation unit which generates chronological information based on the state information and the timing information acquired; a superimposition unit which makes the timing indicated in the timing information coincide and which superimposes a plurality of pieces of the chronological information; and a display portion which displays the pieces of chronological information which are superimposed.

7 Claims, 9 Drawing Sheets

(51) Int. Cl.
*B23C 9/00* (2006.01)
*B23Q 15/22* (2006.01)

(56) References Cited

U.S. PATENT DOCUMENTS

| | | | | |
|---|---|---|---|---|
| 2007/0248122 | A1* | 10/2007 | Hamilton | G01R 13/0254 370/503 |
| 2009/0326680 | A1* | 12/2009 | Landgraf | G05B 19/042 700/49 |
| 2010/0265253 | A1* | 10/2010 | Li | G06T 11/203 345/440 |
| 2012/0262765 | A1* | 10/2012 | Saito | B65H 7/08 358/488 |
| 2013/0238103 | A1* | 9/2013 | Takemoto | G05B 19/406 700/83 |
| 2015/0243040 | A1* | 8/2015 | Ben-Oni | G06T 11/206 345/629 |
| 2016/0299488 | A1* | 10/2016 | Ogawa | G05B 19/4065 |

FOREIGN PATENT DOCUMENTS

| | | | |
|---|---|---|---|
| DE | 102009004285 A1 | 12/2009 | |
| DE | 102016000100 A1 | 7/2016 | |
| DE | 102016106084 A1 | 10/2016 | |
| JP | H035123 A * | 1/1991 | ........... B29C 45/768 |
| JP | 4-269119 | 9/1992 | |
| JP | H04269119 A * | 9/1992 | |
| JP | 2001-255915 | 9/2001 | |
| JP | 2004-216715 | 8/2004 | |
| JP | 2005-011203 | 1/2005 | |
| JP | 2008142254 A * | 6/2008 | |
| JP | 2010-092405 | 4/2010 | |
| JP | 2015-052846 | 3/2015 | |
| JP | 2015-219657 | 12/2015 | |
| JP | 2017-033346 | 2/2017 | |

OTHER PUBLICATIONS

Office Action dated Dec. 25, 2020 in CN Patent Application No. CN201910080315.4.

Office Action dated Feb. 3, 2021 in DE Patent Application No. 102019200622.1.

* cited by examiner

SYSTEM AND METHOD FOR MONITORING MACHINE TOOL OPERATIONS WITH SUPERIMPOSED CHRONOLOGICAL INFORMATION

BACKGROUND OF THE INVENTION

This application is based on and claims the benefit of priority from Japanese Patent Application No. 2018-14051, field on 30 Jan. 2018, the content of which is incorporated herein by reference.

FIELD OF THE INVENTION

The present invention relates to a display unit and a machine tool.

RELATED ART

Conventionally, a machine tool which machines a work according to a machining program is known. The machining program includes a plurality of program blocks which are identified by sequence numbers. The machine tool sequentially executes the program blocks according to the sequence numbers, and thereby can machine the work.

In order to further reduce a machining time, it is preferable to optimize the machining program. Hence, while a speed at which the work is machined and the data of a load are being checked on the machine tool, an improvement of the program blocks is performed. Whether the reduction of the machining time is realized can be checked by chronologically graphing a processing state using the machining program before the improvement and a processing state using the machining program after the improvement so as to compare them.

As a technology for facilitating the checking of the two processing states, a monitor device for an injection molding machine is proposed which can visually and easily grasp the progress of a variate change pattern (variate change waveform) between molding cycles (see, for example, Patent Document 1). An electrical discharge machine is also proposed which displays, in an identifiable display form, data in the same type of electrical discharge machining and exemplary electrical discharge machining in the past and data in current machining so as to overlap them (see, for example, Patent Document 2).

Patent Document 1: Japanese Unexamined Patent Application, Publication No. 2004-216715
Patent Document 2: Japanese Unexamined Patent Application, Publication No. H04-269119

SUMMARY OF THE INVENTION

In the monitor device disclosed in Patent Document 1, an injection pressure and an injection speed are displayed at the same period for each of molding cycles. In the electrical discharge machine disclosed in Patent Document 2, machining data in the middle of electrical discharge machining and machining state data are displayed so as to overlap the data in the same type of electrical discharge machining and the exemplary electrical discharge machining in the past.

As described above, the graphs of the two processing states are superimposed on one screen, and thus it is possible to easily check a difference between the processing states. Furthermore, when at least one of a plurality of program blocks is improved, it is more preferably possible to clearly display how the improvement affects an overall machining process.

The present invention relates to a display unit and a machine tool which can clearly display how an improvement of a machining program affects an overall machining process.

(1) The present invention relates to a display unit (for example, a display unit 20 which will be described later) which displays information obtained from a machine tool (for example, a machine tool 10 which will be described later) that executes a machining program including a plurality of blocks as a plurality of program blocks identified by sequence numbers, and which includes: a data acquisition unit (for example, a data acquisition unit 21 which will be described later) which acquires state information that indicates the state of the machine tool being operated as an amount of variation and a time axis, and timing information which indicates predetermined timing of the machining program executed by the machine tool; a chronological information generation unit (for example, an chronological information generation unit 22 which will be described later) which generates chronological information based on the state information and the timing information acquired; a superimposition unit (for example, a superimposition unit 25 which will be described later) which makes the timing indicated in the timing information coincide and which superimposes a plurality of pieces of the chronological information; and a display portion (for example, a display portion 26 which will be described later) which displays the pieces of chronological information which are superimposed.

(2) Preferably, in the display unit of (1) described above, the data acquisition unit acquires, as the timing information, timing information which includes information of the start time of at least one of a plurality of sequences.

(3) Preferably, in the display unit of (1) or (2) described above, the data acquisition unit acquires, as the timing information, timing information which includes information of a preset time.

(4) Preferably, the display unit of (1) to (3) described above further includes a superimposition information acquisition unit (for example, a superimposition information acquisition unit 24 which will be described later) which acquires superimposition information indicating timing that is made to coincide, and the superimposition unit makes the timing indicated in the superimposition information acquired by the superimposition information acquisition unit coincide and superimposes the pieces of chronological information.

(5) Preferably, in the display unit of (1) to (4) described above, the data acquisition unit acquires the state information and the timing information from a plurality of the machine tools.

(6) Preferably, in the display unit of (1) to (5) described above, the superimposition unit displaces the pieces of chronological information along an axial direction indicating the amount of variation and superimposes the pieces of chronological information.

(7) Preferably, in the display unit of (1) to (6) described above, the data acquisition unit acquires, as the timing information, the information of a start time of at least one of a plurality of sequences and a finish time corresponding to the start time, the superimposition unit calculates a time difference between the finish times corresponding to the pieces of chronological information which are superimposed and the display portion displays the time difference which is calculated.

(8) The present invention relates to a machine tool which includes the display unit of any one of (1) to (7) described above.

According to the present invention, it is possible to provide a display unit and a machine tool which can clearly display how an improvement of a machining program affects an overall machining process.

DETAILED DESCRIPTION OF THE INVENTION

First Embodiment

A display unit 20 and a machine tool 10 according to the present invention will be described below with reference to drawings. A display unit 20 and a machine tool 10 according to a first embodiment of the present invention will first be described with reference to FIGS. 1 to 8.

Figure 1:
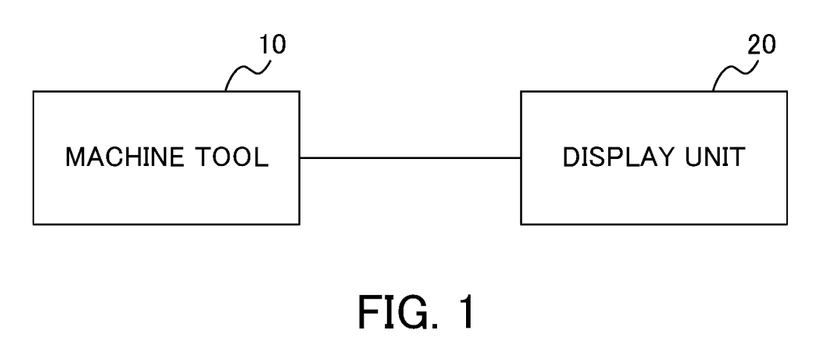
FIG. 1 is an overall configuration diagram showing a connection relationship between a machine tool and a display unit according to a first embodiment of the present invention.
Figure 2:
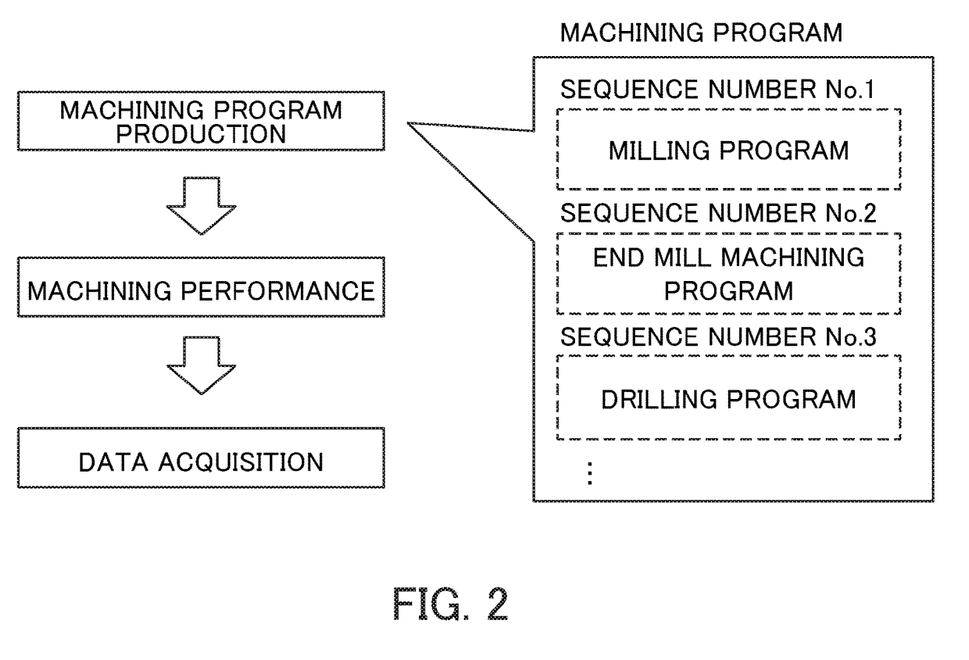
FIG. 2 is a conceptual view showing a relationship between the flow of machining processing which is performed in the machine tool of the first embodiment and an example of a machining program.
Figure 3:
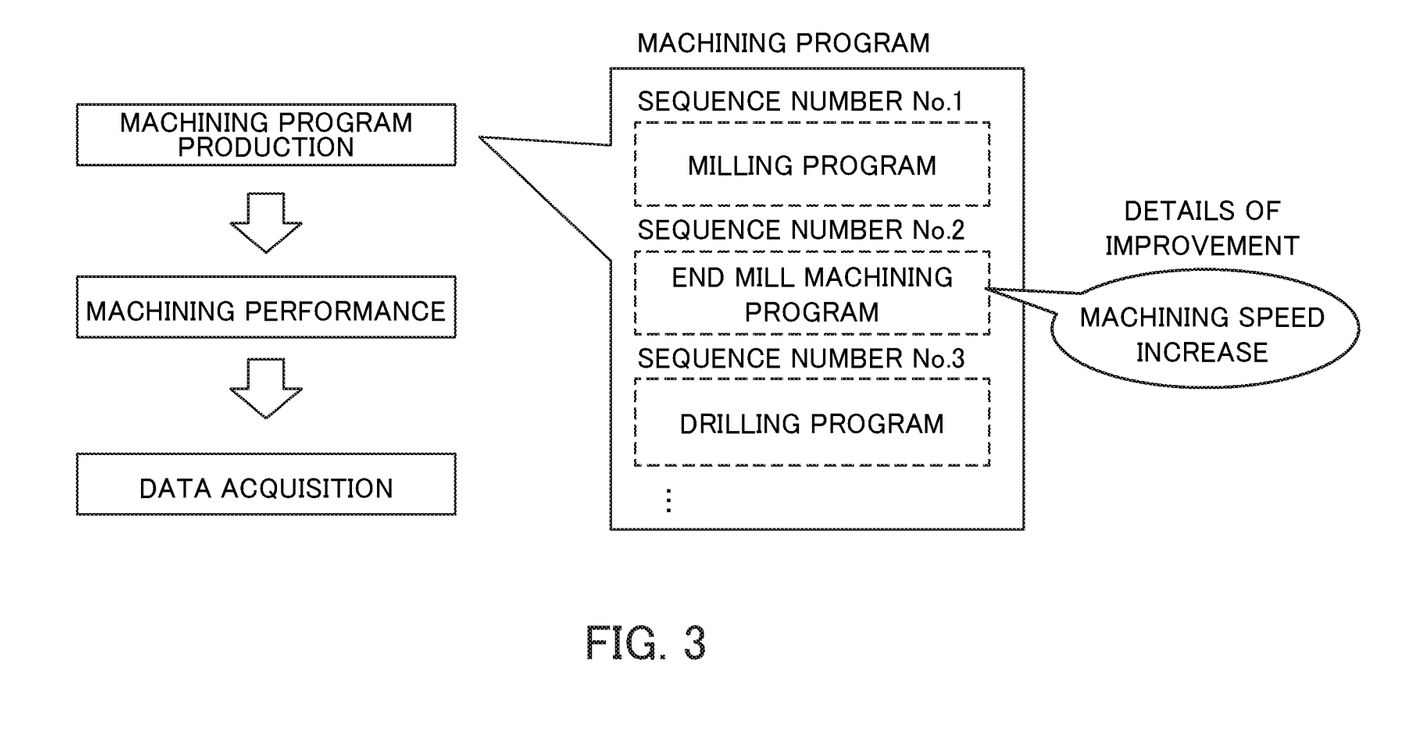
FIG. 3 is a conceptual view showing a relationship between the flow of the machining processing which is performed in the machine tool of the first embodiment and an example of an improved machining program.
Figure 4:
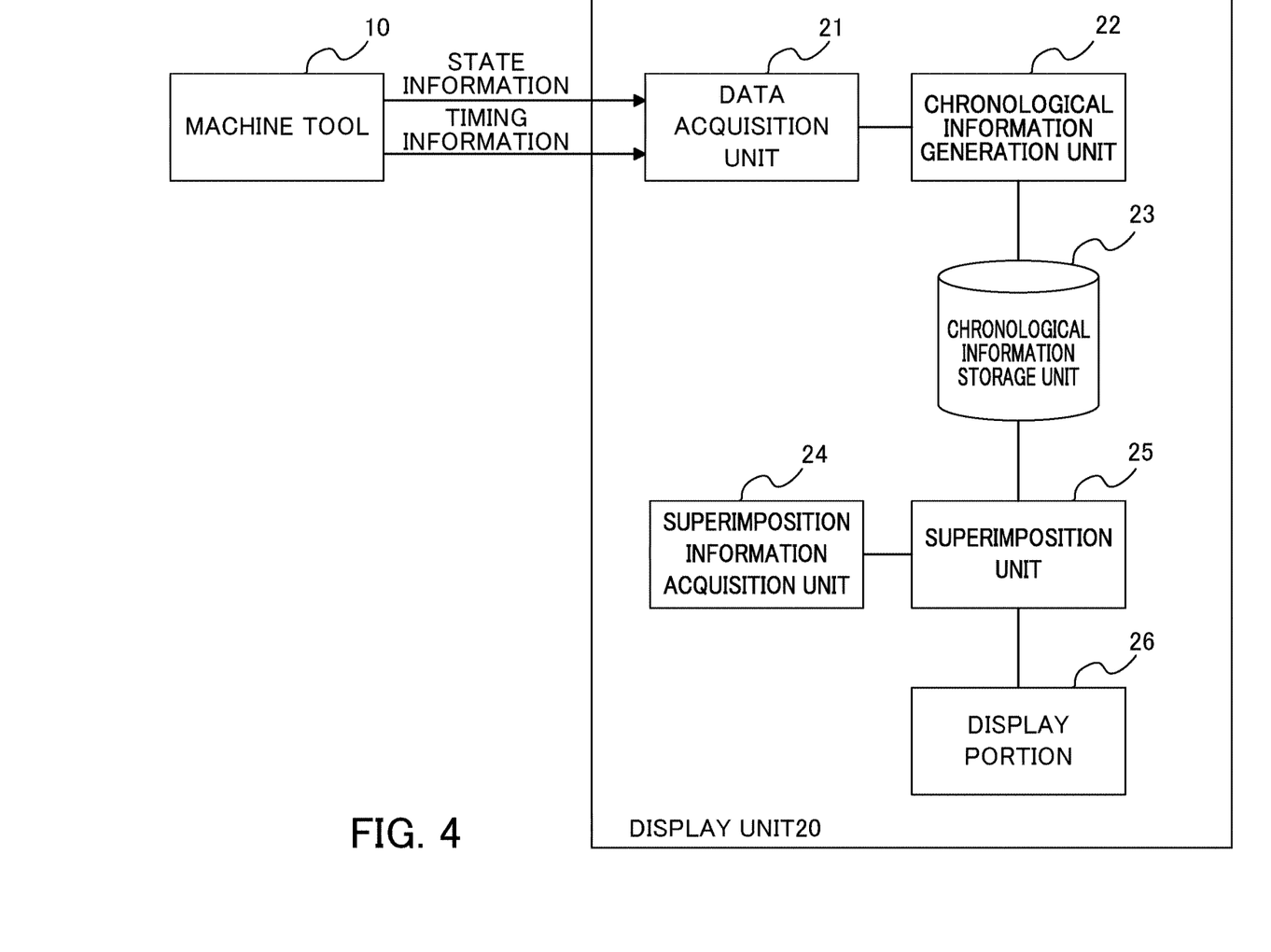
FIG. 4 is a block diagram showing the display unit of the first embodiment.
Figure 5:
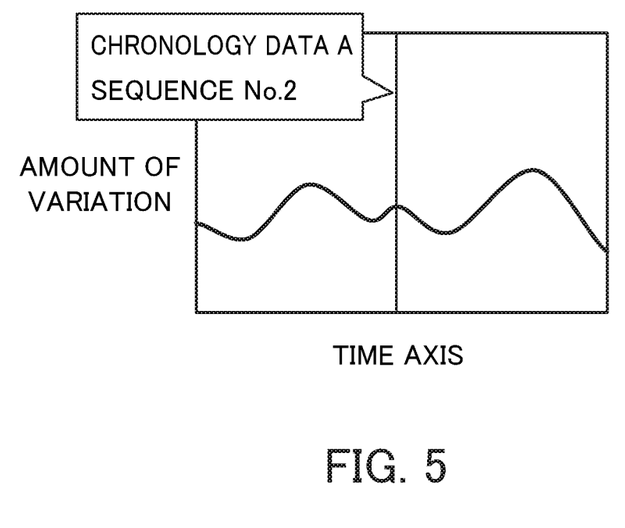
FIG. 5 is a graph of chronological information showing position data when the machining processing is performed using the machining program of FIG. 2.
Figure 6:
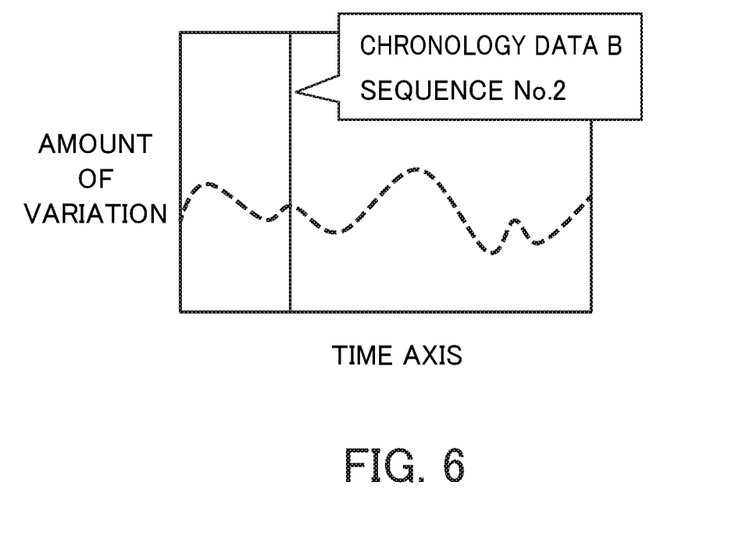
FIG. 6 is a graph of chronological information showing position data when the machining processing is performed using the machining program of FIG. 3.
Figure 7:
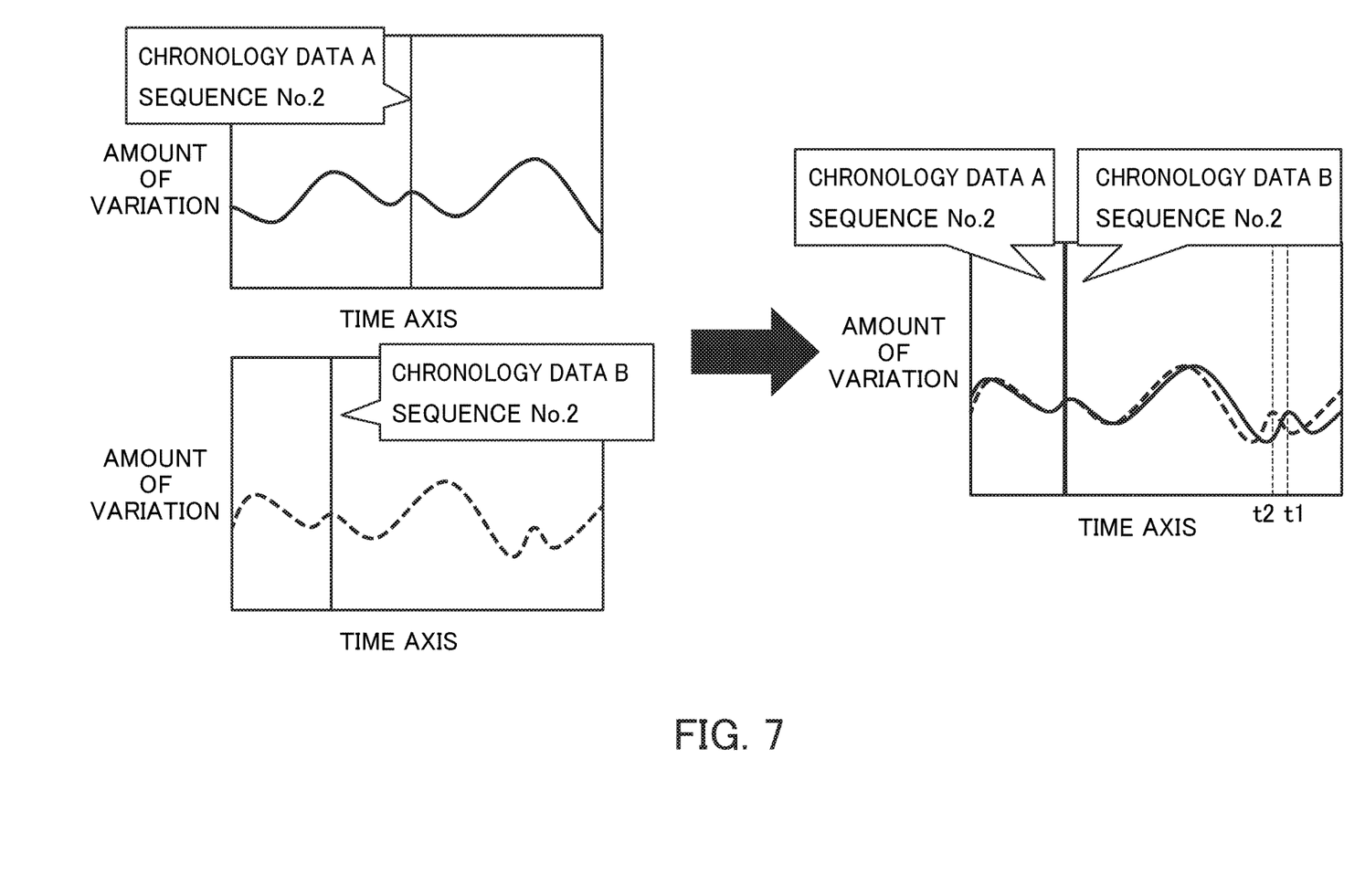
FIG. 7 is a schematic view when the graph of the chronological information of FIG. 3 and the graph of the chronological information of FIG. 6 are displayed so as to be superimposed.
Figure 8:
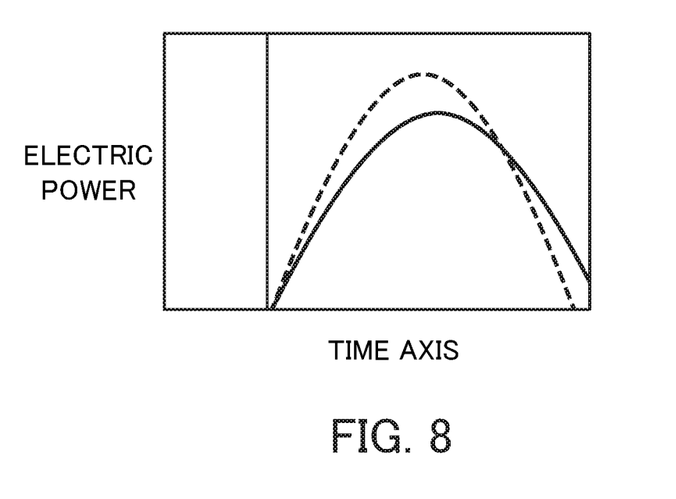
FIG. 8 is a schematic view when the graph of chronological information showing machining load data when the machining processing is performed using the machining program of FIG. 2 and the graph of chronological information showing machining load data when the machining processing is performed using the machining program of FIG. 3 are displayed so as to be superimposed.

FIG. 1 is an overall configuration diagram showing a connection relationship between the machine tool 10 and the display unit 20 according to the first embodiment of the present invention. FIG. 2 is a conceptual view showing a relationship between the flow of machining processing which is performed in the machine tool 10 of the first embodiment and an example of a machining program. FIG. 3 is a conceptual view showing a relationship between the flow of the machining processing which is performed in the machine tool 10 of the first embodiment and an example of an improved machining program. FIG. 4 is a block diagram showing the display unit 20 of the first embodiment. FIG. 5 is a graph of chronological information showing position data when the machining processing is performed using the machining program of FIG. 2. FIG. 6 is a graph of chronological information showing position data when the machining processing is performed using the machining program of FIG. 3. FIG. 7 is a schematic view when the graph of the chronological information of FIG. 3 and the graph of the chronological information of FIG. 6 are displayed so as to be superimposed. FIG. 8 is a schematic view when the graph of chronological information showing machining load data when the machining processing is performed using the machining program of FIG. 2 and the graph of chronological information showing machining load data when the machining processing is performed using the machining program of FIG. 3 are displayed so as to be superimposed.

The connection relationship between the machine tool 10 and the display unit 20 of the present invention will first be described. The machine tool 10 is a machine which machines a work with a machining program that is set. As shown in FIG. 1, the machine tool 10 is connected to the display unit 20 which will be described later. The machine tool 10 executes the machining program which is set and which includes a plurality of program blocks identified by sequence numbers, and thereby machines the work. The program blocks are, for example, a milling program, an end mill machining program and a drilling program. The machine tool 10 sequentially executes the program blocks according to the sequence numbers. The machine tool 10 performs machining, for example, based on the machining program which is produced as shown in FIGS. 2 and 3 and which includes the program blocks identified by the sequence numbers. The machine tool 10 outputs, to the display unit 20, information obtained by performing the machining.

The display unit 20 is a unit which displays the information obtained from the machine tool 10 described above. As shown in FIG. 4, the display unit 20 acquires state information indicating a processing state from the machine tool 10. The display unit 20 acquires, for example, as the state information, the data of the processing state such as a machining load and a speed, an amount of variation in machining position and an amount of variation in electric power. The display unit 20 also acquires, from the machine tool 10, timing information indicating predetermined timing of the machining program which is executed by the machine tool 10. The display unit 20 acquires, for example, from the machine tool 10, as the timing information, timing information indicating the sequence numbers corresponding to the state information.

In the machine tool 10 and the display unit 20 described above, processing is performed based on the machining program as shown in FIG. 2 so as to machine the work. The display unit 20 acquires the data of the processing state of the machining of the work as the state information from the machine tool 10 in real time. The display unit 20 acquires the sequence numbers corresponding to the state information as the timing information from the machine tool 10 in real time. The machine tool 10 performs processing based on the machining program as shown in FIG. 3 (machining program in which the end mill machining program is improved on the machining program of FIG. 2) so as to machine the work. The display unit 20 acquires the data of the processing state of the machining of the work as the state information from the machine tool 10 in real time.

The display unit 20 acquires the sequence numbers corresponding to the state information as the timing information from the machine tool 10 in real time. In other words, the display unit 20 acquires, from the machine tool 10 which individually machines the work with a plurality of machining programs, a plurality of pieces of state information and timing information in the machining programs. The display unit 20 may acquire the state information and the timing information in each of the machining programs.

The display unit 20 described above includes, as shown in FIG. 4, a data acquisition unit 21, a chronological information generation unit 22, a chronological information storage unit 23, a superimposition information acquisition unit 24, a superimposition unit 25 and a display portion 26.

The data acquisition unit 21 is, for example, an input/output interface. The data acquisition unit 21 acquires the state information (see FIGS. 5 and 6 which will be described later) which indicates the state of the machine tool 10 being operated as an amount of variation and a time axis, and the timing information which indicates the predetermined timing of the machining program executed by the machine tool 10. The data acquisition unit 21 acquires, for example, according to the operation of the machine tool 10, the data of the processing state such as the machining load and the speed, the amount of variation in machining position and the amount of variation in electric power from the machine tool 10 in real time. The data acquisition unit 21 acquires, as the timing information, timing information which includes the information of the start time of at least one of a plurality of sequences. The data acquisition unit 21 acquires, for example, as the timing information, the start time and the finish time of a sequence number for identifying the program block which is processed by the machine tool 10. The data acquisition unit 21 acquires, as the timing information, timing information which includes the information of a preset time.

The chronological information generation unit 22 generates the chronological information based on the state information and the timing information which are acquired. The chronological information generation unit 22 generates the chronological information for each piece of state information and the timing information acquired. The chronological information generation unit 22 generates, for example, chronological information as shown in FIGS. 5 and 6. In other words, the chronological information generation unit 22 generates, for example, the chronological information in which a horizontal axis is the time axis and a vertical axis is the amount of variation and which includes the start time and the finish time of the program block that is executed and that is identified by the sequence number.

The chronological information storage unit 23 is, for example, an auxiliary storage device such as a memory or a hard disk. The chronological information storage unit 23 stores the chronological information which is generated by the chronological information generation unit 22.

The superimposition information acquisition unit 24 acquires superimposition information indicating timing which is made to coincide on the time axes of a plurality of pieces of chronological information. The superimposition information acquisition unit 24 acquires, as the superimposition information, for example, a preset time and a preset sequence number.

The superimposition unit 25 reads the pieces of chronological information from the chronological information storage unit 23. The superimposition unit 25 receives the superimposition information acquired by the superimposition information acquisition unit 24. The superimposition unit 25 makes the timing indicated in the timing information coincide, and superimposes the pieces of chronological information which are read. Specifically, the superimposition unit 25 makes the timing indicated in the superimposition information coincide, and superimposes the pieces of chronological information which are read. For example, the superimposition unit 25 receives, as the superimposition information, timing at which sequence No. 2 that is a sequence number is made to coincide. As shown in FIG. 7, the superimposition unit 25 makes the timing of the start time of the sequence No. 2 coincide and superimposes the pieces of chronological information which are read. The "timing is made to coincide" here indicates that the time axis of another piece of chronological information is moved to the time axis of one piece of chronological information such that the timing indicated in the timing information is made to coincide. The display portion 26 displays the pieces of chronological information which are superimposed.

The operation of the display unit 20 according to the present invention will then be described. The machining program as shown in FIG. 2 is first set in the machine tool 10. The machine tool 10 machines the work according to the machining program which is set. The data acquisition unit 21 acquires, in real time, the state information and the timing information from the machine tool 10 which is in the middle of machining the work. The chronological information generation unit 22 generates the chronological information as shown in FIG. 5 based on the state information and the timing information acquired. The data acquisition unit 21 stores the generated chronological information in the chronological information storage unit 23.

Then, the machining program as shown in FIG. 3 is set in the machine tool 10. In other words, the improved machining program is set in the machine tool 10. In the present embodiment, the machining program which is improved such that the machining speed of the end mill machining program in the sequence No. 2 that is a sequence number is increased is set in the machine tool 10. The machine tool 10 machines the work according to the machining program which is set. The data acquisition unit 21 acquires, in real time, the state information and the timing information from the machine tool 10 which is in the middle of machining the work.

The chronological information generation unit 22 generates the chronological information as shown in FIG. 6 based on the state information and the timing information acquired. The data acquisition unit 21 stores the generated chronological information in the chronological information storage unit 23.

Then, the superimposition unit 25 receives the superimposition information acquired by the superimposition information acquisition unit 24. The superimposition unit 25 acquires a plurality of pieces of chronological information stored in the chronological information storage unit 23. Based on the timing indicated in the superimposition information, the superimposition unit 25 makes the timing of the pieces of chronological information coincide. For example, the superimposition unit 25 moves the pieces of chronological information along the time axis (horizontal axis) so as to make the timing of the pieces of chronological information coincide. The superimposition unit 25 superimposes the pieces of chronological information in a state where the timing is made to coincide. In the present embodiment, the superimposition unit 25 makes the start time of the sequence No. 2 serving as a target sequence number coincide, and superimposes the pieces of chronological information. In this way, the superimposition unit 25 generates the graph of chronological information showing position data as shown in FIG. 7 and the graph of chronological information showing machining load data as shown in FIG. 8.

Then, the display portion 26 displays the pieces of chronological information which are superimposed. In this way, as shown in FIG. 7, a difference between the processing finish time t1 of the sequence No. 2 in the former chronological information and the processing finish time t2 of the sequence No. 2 in the latter chronological information is displayed. As shown in FIG. 8, a difference between the machining load of the sequence No. 2 in the former chronological information and the machining load of the sequence No. 2 in the latter chronological information is displayed. In the present embodiment, it is found that by the machining program in which the end mill machining program is improved, the machining time is reduced. On the other hand, it is found that by the machining program in which the end mill machining program is improved, the machining load is increased.

With the display unit 20 described above, the following effects are achieved.

(1) The display unit 20 includes the data acquisition unit 21 which acquires state information that indicates the state of the machine tool 10 being operated with the amount of variation and the time axis, and timing information which indicates the predetermined timing of the machining program executed by the machine tool 10; the chronological information generation unit 22 which generates chronological information based on the state information and the timing information acquired; the chronological information generation unit 22 which makes the timing indicated in the timing information coincide and which superimposes a plurality of pieces of the chronological information; the superimposition unit 25 which makes the timing indicated in the timing information coincide and which superimposes the pieces of the chronological information; and the display portion 26 which displays the pieces of chronological information which are superimposed. In this way, the pieces of chronological information in which the timing is made to coincide are displayed on the display portion 26. Thus, a difference between the processing times of the pieces of chronological information can be visually and easily displayed. Hence, it is possible to clearly display how the improvement of the machining program affects the overall machining process.

(2) The data acquisition unit 21 acquires, as the timing information, timing information which includes the information of the start time of at least one of a plurality of sequences. In this way, it is possible to generate the chronological information including the start time of at least one of the sequences.

(3) The data acquisition unit 21 acquires, as the timing information, timing information which includes the information of a preset time. In this way, it is possible to generate the chronological information including the information of the preset time.

(4) The display unit 20 further includes the superimposition information acquisition unit 24 which acquires the superimposition information indicating the timing that is made to coincide, and the superimposition unit 25 makes the timing indicated in the superimposition information acquired by the superimposition information acquisition unit 24 coincide and superimposes the pieces of chronological information. In this way, the timing at which the superimposition is performed can be changed by the superimposition information, and thus it is possible to enhance the convenience of the display unit 20.

Second Embodiment

Figure 9:
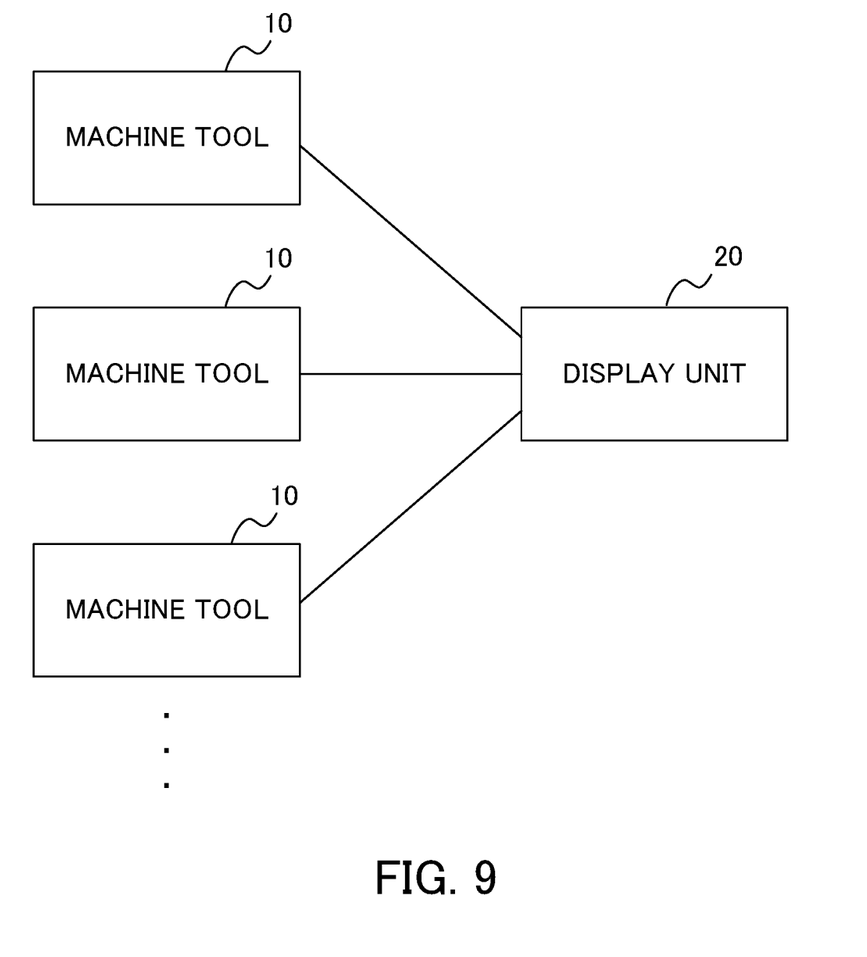
FIG. 9 is an overall configuration diagram showing a connection relationship between a machine tool and a display unit according to a second embodiment of the present invention.

A display unit 20 and a machine tool 10 according to a second embodiment of the present invention will then be described with reference to FIG. 9. In the description of the second and subsequent embodiments, the same configuration requirements are identified by the same reference numerals, and the description thereof will be omitted or simplified. FIG. 9 is an overall configuration diagram showing a connection relationship between the machine tool 10 and the display unit 20 according to the second embodiment of the present invention. The display unit 20 according to the second embodiment differs from that according to the first embodiment in that, as shown in FIG. 9, the display unit 20 is connected to a plurality of machine tools 10.

The operation of the display unit 20 according to the second embodiment will be described. A data acquisition unit 21 acquires state information from each of the machine tools 10. The data acquisition unit 21 acquires timing information from each of the machine tools 10. A chronological information generation unit 22 uses the state information and the timing information acquired so as to generate chronological information for each of the machine tools 10. The chronological information generation unit 22 stores the generated chronological information in a chronological information storage unit 23.

A superimposition unit 25 reads a plurality of pieces of chronological information which are stored. The superimposition unit 25 makes timing indicated in the timing information included in the pieces of chronological information read coincide, and superimposes the pieces of chronological information. The display portion 26 displays the chronological information superimposed by the superimposition unit 25.

With the display unit 20 and the machine tools 10 described above, the following effect is achieved.

(5) The data acquisition unit 21 acquires the state information and the timing information from a plurality of the machine tools 10. In this way, the chronological information of the machine tools 10 can be displayed in a state where the timing is made to coincide. Hence, it is possible to display the condition of the machining of the machine tools 10 and the condition of the machining of another machine tool 10 in a state where they can be easily determined.

Third Embodiment

A display unit 20 and a machine tool 10 according to a third embodiment of the present invention will then be described. The display unit 20 according to the third embodiment differs from those according to the first and second embodiments in that a superimposition information acquisition unit 24 acquires movement information indicating the amount of movement in which one piece of chronological information is moved along an axial direction indicating the amount of variation in chronological information. The display unit 20 according to the third embodiment also differs from those according to the first and second embodiments in that a superimposition unit 25 moves, based on the acquired movement information, one or a plurality of pieces of chronological information along the axial direction indicating the amount of variation and superimposes the pieces of chronological information.

The operation of the display unit 20 and the machine tool 10 according to the third embodiment will be described. The superimposition information acquisition unit 24 acquires the movement information. The superimposition unit 25 makes timing indicated in timing information coincide on the pieces of chronological information, and moves, based on the movement information, another piece of chronological information to one piece of chronological information. In other words, the superimposition unit 25 superimposes the pieces of chronological information in which the chronology is made to coincide at the timing indicated in the timing information and which are displaced by the amount of movement indicated in the movement information in the axial direction along the amount of variation. A display portion 26 displays the chronological information superimposed in the superimposition unit 25.

With the display unit 20 and the machine tool 10 described above, the following effect is achieved.

(6) The superimposition unit 25 displaces the pieces of chronological information along an axial direction indicating the amount of variation and superimposes the pieces of chronological information. In this way, with respect to the amount of variation in the pieces of chronological information, they can be displayed so as to be displaced along the axial direction indicating the amount of variation. Hence, it is possible to reduce the overlapping of the pieces of chronological information, and thus it is possible to display the comparison of the pieces of chronological information easily.

Fourth Embodiment

A display unit 20 and a machine tool 10 according to a fourth embodiment of the present invention will then be described. The display unit 20 according to the fourth embodiment differs from those according to the first to third embodiments in that the display unit 20 is incorporated in the machine tool 10.

With the display unit 20 according to the fourth embodiment described above, the following effect is achieved.

(7) The machine tool 10 includes the display unit 20 according to the first to third embodiments described above. In this way, it is possible to display chronological information simultaneously with the acquisition of at least two pieces of state information and timing information. In this way, it is possible to more easily display the chronological information which is superimposed.

Although the preferred embodiments of the display unit and the machine tool of the present invention are described above, the present invention is not limited to the embodiments described above, and modifications can be made as necessary. Variations and improvements are included in the present invention as long as they can achieve the object of the present invention.

For example, in the individual embodiments described above, the superimposition unit 25 may measure a time elapsing after the start time and a time elapsing after the finish time of a sequence number included in the chronological information, and may display them separately from the superimposed chronological information. For example, based on the start time and the finish time of a sequence number in which timing is made to coincide, the superimposition unit 25 may measure the machining times of a plurality of pieces of chronological information and may calculate a time difference. The display portion 26 may display the calculated time difference or the measured machining times separately from the superimposed chronological information. In this way, the improved machining times can be displayed such that they can easily be distinguished.

In the embodiments described above, the machine tool 10 may directly output the chronological information instead of outputting the state information and the timing information to the display unit 20. In this case, in the machine tool 10, a machining program, into which timing that is previously made to coincide is inserted, is set. In the middle of executing the machining program, the machine tool 10 generates the chronological information in which the information of the timing that is made to coincide is inserted into the state information. Specifically, the machine tool 10 includes the data acquisition unit 21, the chronological information generation unit 22, and the chronological information storage unit 23 in the display unit 20 according to the first to third embodiments. In this way, it is possible to display a plurality of pieces of chronological information more easily.

When in the embodiments described above, the state information is information indicating the amount of variation in electric power, the superimposition unit 25 may integrate the amount of variation between the start time and the finish time of the sequence number so as to calculate power consumption. The display unit 20 displays the calculated power consumption.

EXPLANATION OF REFERENCE NUMERALS

10 machine tool
20 display unit
21 data acquisition unit
22 chronological information generation unit
24 superimposition information acquisition unit
25 superimposition unit
26 display portion

What is claimed is:

1. A display unit which displays information obtained from a machine tool that executes a machining program including a plurality of blocks as a plurality of program blocks identified by sequence numbers, the display unit comprising:

a data acquisition unit which acquires, in real time, state information that indicates a state of the machine tool being operated as an amount of variation and a time axis, and timing information which indicates predetermined timing of the machining program executed by the machine tool;

a chronological information generation unit which generates chronological information based on the state information and the timing information acquired;

a superimposition unit which makes the timing indicated in the timing information coincide and which superimposes a plurality of pieces of the chronological information; and a display portion which displays the pieces of chronological information which are superimposed, wherein the data acquisition unit acquires, as the timing information, information of a start time of at least one of a plurality of sequences of the machining program executed by the machine tool and a finish time corresponding to the start time, the superimposition unit calculates a time difference between the finish times corresponding to the pieces of chronological information which are superimposed and the display portion displays the time difference which is calculated.

2. The display unit according to claim 1, wherein the data acquisition unit acquires, as the timing information, timing information which includes information of a preset time.

3. The display unit according to claim 1 further comprising: a superimposition information acquisition unit which acquires superimposition information indicating timing that is made to coincide,
    wherein the superimposition unit makes the timing indicated in the superimposition information acquired by the superimposition information acquisition unit coincide and superimposes the pieces of chronological information.

4. The display unit according to claim 1, wherein the data acquisition unit acquires the state information and the timing information from a plurality of the machine tools.

5. The display unit according to claim 1, wherein the superimposition unit displaces the pieces of chronological information along an axial direction indicating the amount of variation and superimposes the pieces of chronological information.

6. A machine tool comprising the display unit according to claim 1.

7. The display unit according to claim 1, wherein the state information and the timing information are acquired from the machine tool in real time.

* * * * *